Patented Sept. 22, 1931

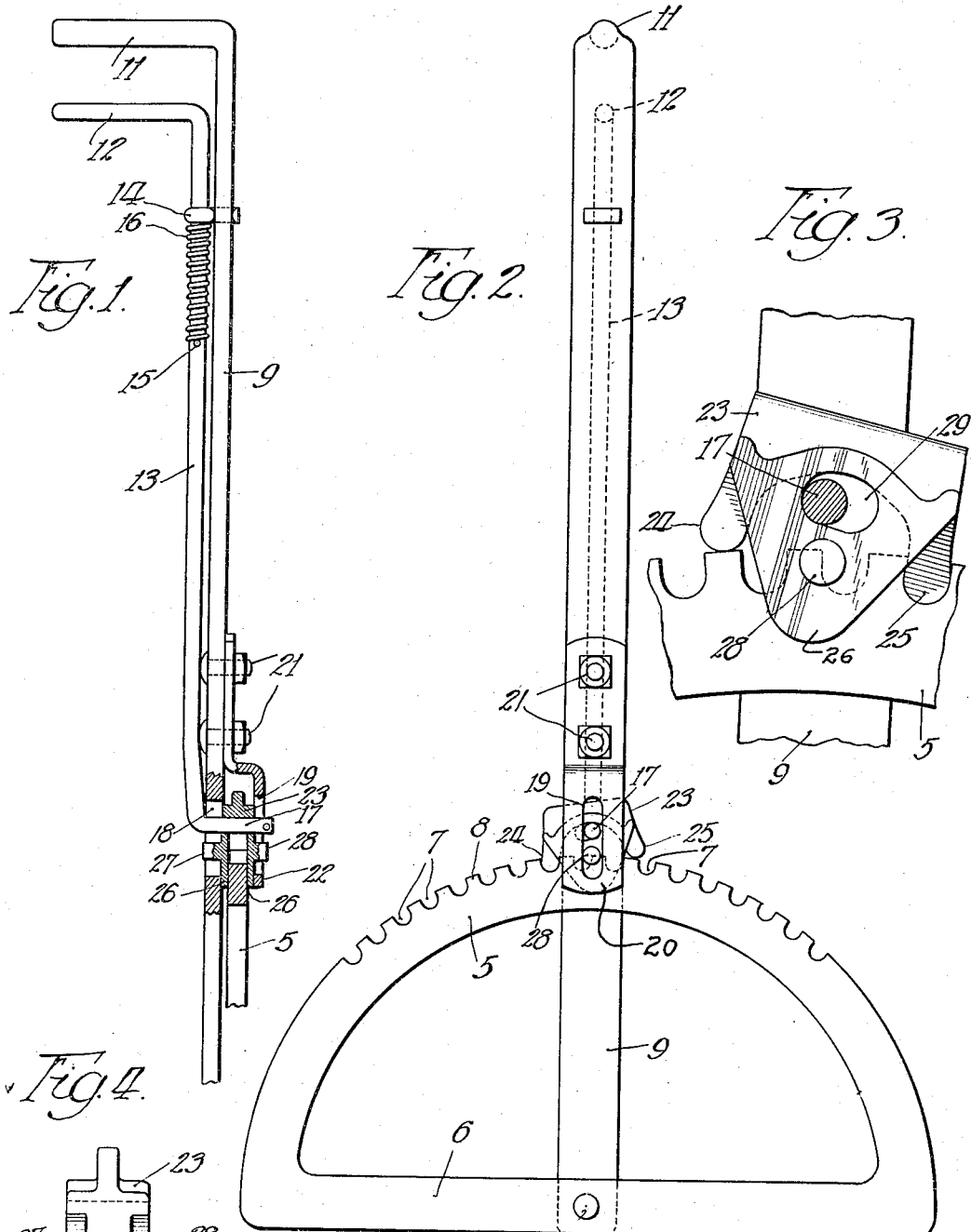

1,824,515

UNITED STATES PATENT OFFICE

HARRY RANDALL TRAPHAGEN, OF ROCKFORD, ILLINOIS, ASSIGNOR TO J. I. CASE COMPANY, OF RACINE, WISCONSIN, A CORPORATION OF WISCONSIN

LEVER DETENT MECHANISM

Application filed August 12, 1929. Serial No. 385,284.

The present invention, while susceptible of wider application, is designed more particularly to provide an improved lever mechanism for use in agricultural implements, as for example, in effecting the adjustment, with respect to the ground, of the soil tilling devices of cultivators, plows, planters and the like.

The invention consists in the features of novelty hereinafter described, illustrated in the accompanying drawings and particularly pointed out in the claims at the end of this specification.

Figure 1 is a view in end elevation of a device embodying my invention, parts being shown in vertical section;

Figure 2 is a view in side elevation;

Figure 3 is a detail view upon an enlarged scale, showing part of the segment rack and pawl in engagement therewith; and Figure 4 is a detail view of the detent pawl.

In lever mechanism such as commonly used in agricultural implements, it is highly desirable that the notches of the rack bar that cooperate with the detent pawl of the operating lever shall be so spaced as to permit a fine or close adjustment of the lever, in order to give to the soil tilling implement, or like part controlled thereby, exactly the desired position with respect to the ground. Heretofore it has been the practice to provide such operating lever with a spring actuated detent pawl having a single tooth for engagement with the notches of the rack bar, the pawl being provided with suitable means, such as a latch rod, whereby it may be disengaged from the rack. Ordinarily, the notches of the rack bar are formed by punching out parts of the metal at the periphery of the rack, but in practice it is found extremely difficult to obtain the desired thickness or body of the rack bar where its notches are made close enough together to effect a fine adjustment of the lever. If the rack bar be made thick enough to stand up under the strains to which it is subjected, the punching of the notches cannot be effected without danger of breaking the tools or distorting the bar.

My invention provides lever detent mechanism of such character that the notches in the rack bar may be more widely spaced so that a heavier bar may be used, while at the same time a fine or more delicate adjustment of the lever mechanism can be attained.

Referring to the drawings, the rack bar is shown as comprising a segmental portion 5 united at the bottom by a transverse bar 6, and in the periphery of the rack bar 5 are formed the notches 7 with the teeth 8 between them, the crowns of the teeth 8 being preferably flattened, as shown. In the embodiment of my invention illustrated in the drawings, the operating lever 9 is pivoted as at 10 to the base bar 6 of the rack and the upper end of this operating lever 9 is provided with the usual offset grip handle 11. Adjacent the grip handle 11 is arranged an offset grip handle 12 on the latch rod 13, the upper portion of which passes through an eye-bolt 14 attached to the lever 9. Between the eye-bolt 14 and a pin 15 passing through the latch rod 13 is arranged a coil spring 16 that tends to force the latch rod normally downward. The lower end of the latch rod 13 is provided with an offset arm 17 that passes through a vertical slot 18 formed in the lever 9 and through a corresponding slot 19 formed in a guard bar 20 that is bolted as at 21 to the lever 9.

Between the offset lower portion 22 of the guard bar 20 and the side of the lever 9 is placed a detent pawl 23 that is formed with a plurality of teeth 24 and 25 adapted to engage the notches of the segment rack 5.

In the preferred embodiment of my invention, the detent pawl 23 is formed as shown in the drawings—that is to say, the pawl comprises a single piece or casting having depending walls 26 from which project the lugs or trunnions 27 and 28 that pass respectively through the slot 18 of the lever 9 and the slot 19 of the guard bar 20. Through the detent pawl 23 is formed an oblong slot or opening 29 through which passes the offset arm 17 at the lower end of the latch rod 13, the slot 19 being somewhat larger than the arm 17, to permit the pivotal movement of the detent pawl about its lugs or trunnions 27 and 28. The depending walls 26 of the detent pawl 23 are spaced at such distance apart as to enable the pawl to straddle the rack bar 5. The notches 7 of the rack 5 and the teeth 24 and 25 of the detent pawl 23 are unequally spaced relative to each other, i. e., the space between the teeth 24 and 25 is not equal to a multiple of the space between the rack teeth, so that when one of the teeth 24, for example, is in engagement with the notch 7 of the rack, the other tooth 25 of the pawl will not enter the rack teeth, but as shown, will bear upon the crown of one of such teeth.

Thus it will be seen that if the parts be in the position shown in Fig. 2 of the drawings, the tooth 24 of the detent pawl 23 will be in engagement with one of the notches 7 of the rack, while the tooth 25 will bear upon the crown of one of the rack teeth. If now the latch rod 13 be raised by its grip handle 12, against the force of the spring 16, the offset arm 17 of the latch bar will lift the pawl 23 until both its teeth 24 and 25 are disengaged from the rack. If now the lever 9 be moved towards the right to the position shown in Fig. 3 of the drawings, and the grip handle 12 be released, the spring 16 will force the rod 13 and the detent pawl 23 downward so as to cause its tooth 25 to enter a notch 7 of the rack, while the tooth 24 rises upon the crown of one of the rack teeth. It will be seen that in thus causing the teeth 24 and 25 to successively engage the rack teeth 7, it is necessary to move the pawl only half the distance between adjacent notches of the rack. Hence, while the notches 7 of the rack are spaced at considerable distance apart, the provision of the detent pawl with a plurality of teeth enables as fine or close adjustment of the lever to be effected as if the notches of the rack were spaced at half the distance shown.

While I have described what I regard as the preferred embodiment of the invention, it will be apparent that the details of construction above set forth may be varied without departure from the scope of the invention.

I claim as my invention:

1. In lever mechanism of the character described, the combination of a notched rack, a slotted lever, a latch rod, a slotted guard plate carried by said lever, and a detent pawl provided with a plurality of teeth and having pivots within the slots of the lever and guard plate and having an opening to receive an offset part of the latch rod.

2. In lever mechanism of the character described, the combination of a notched rack, a slotted lever, a spring actuated latch rod, a slotted guard plate carried by said lever, and a detent pawl provided with depending parts to straddle the rack and with a plurality of teeth and having pivots within the slots of the lever and guard plate and having an opening to receive an offset part of the latch rod.

3. In lever mechanism of the character described the combination with a toothed rack and lever of a detent device, said device comprising an integral member having a pair of teeth, the space between said teeth not being a multiple of that between the notches on said rack, whereby only one of said teeth will engage a notch at any time, so that said detent may be shifted a distance less than that between said notches and means for shifting the detent device with respect to the rack.

4. In lever mechanism of the character described, the combination of a notched rack, a slotted lever, a latch rod, a slotted guard plate carried by said lever, and a detent pawl provided with a pair of teeth and having pintles disposed within the slots of said lever and guard plate and having an opening to receive an offset portion of said latch rod, said pawl also having a pair of members straddling said rack whereby it may be retained in engagement therewith.

5. A mechanism as defined in claim 1 wherein said pawl has a pair of teeth spaced a distance apart which is not a multiple of the space between said notches, whereby said detent may be moved a distance less than the space between said notches.

6. A mechanism as defined in claim 4 wherein said pawl has a pair of teeth spaced a distance apart which is not a multiple of the space between said notches, whereby said detent may be moved a distance less than the space between said notches.

HARRY RANDALL TRAPHAGEN.